US010785545B2

(12) United States Patent
Metzler et al.

(10) Patent No.: US 10,785,545 B2
(45) Date of Patent: Sep. 22, 2020

(54) SYSTEMS AND METHODS FOR SIMULTANEOUS COMPRESSION AND ENCRYPTION

(71) Applicant: The Board of Regents of the University of Texas System, Austin, TX (US)

(72) Inventors: Richard E. L. Metzler, San Antonio, TX (US); Sos S. Agaian, San Antonio, TX (US)

(73) Assignee: The Board of Regents of The University of Texas System, Austin, TX (US)

( * ) Notice: Subject to any disclaimer, the term of this patent is extended or adjusted under 35 U.S.C. 154(b) by 270 days.

(21) Appl. No.: 14/395,674

(22) PCT Filed: Apr. 22, 2013

(86) PCT No.: PCT/US2013/037651
§ 371 (c)(1),
(2) Date: Oct. 20, 2014

(87) PCT Pub. No.: WO2013/159112
PCT Pub. Date: Oct. 24, 2013

(65) Prior Publication Data
US 2015/0086013 A1 Mar. 26, 2015

Related U.S. Application Data

(60) Provisional application No. 61/636,113, filed on Apr. 20, 2012.

(51) Int. Cl.
*H04N 7/167* (2011.01)
*H04N 21/647* (2011.01)
(Continued)

(52) U.S. Cl.
CPC ....... *H04N 21/64715* (2013.01); *H04L 9/065* (2013.01); *H04L 9/0618* (2013.01);
(Continued)

(58) Field of Classification Search
CPC .......... H04N 21/2343; H04N 21/2347; H04N 21/64715; H04N 21/8458; H04L 9/08; H04L 2209/30
(Continued)

(56) References Cited

U.S. PATENT DOCUMENTS

| 4,386,416 A | 5/1983 | Giltner | 364/900 |
| 5,479,512 A | 12/1995 | Weiss | 380/28 |

(Continued)

FOREIGN PATENT DOCUMENTS

| EP | 0810737 | 12/1997 |
| KR | 10-2011-0105678 | 9/2011 |

OTHER PUBLICATIONS

System for simultaneous compression and encryption by Metzler, Richard E. L., M.S., The University of Texas at San Antonio, 2010, 218 pages; 1483721.*

(Continued)

*Primary Examiner* — Gary S Gracia
(74) *Attorney, Agent, or Firm* — Norton Rose Fulbright US LLP

(57) ABSTRACT

Embodiments of reversible systems and methods for fast, secure and efficient transmission, storage, and protection of digital multimedia are disclosed. The embodiments may have the ability to simultaneously compress and encrypt digital data in order to concurrently reduce data size and prevent reconstruction without the proper encryption key. Embodiments of a method may include pre-processing data to optimize the size of data segments to be compressed, transforming the data for improving the compressibility of (Continued)

the before-mentioned data segments, processing the data sequentially to generate predictive statistical models, encoding the data for simultaneously encrypting and compressing data segments using a keystream, and increasing both the compression ratio and security of these encoding processes using a block cipher. Embodiments of these methods may be suitable for use on both encrypted and unencrypted media.

11 Claims, 8 Drawing Sheets

(51) Int. Cl.
  *H04N 21/2343* (2011.01)
  *H04N 21/2347* (2011.01)
  *H04L 9/06* (2006.01)
  *H04N 21/845* (2011.01)
  *H04N 1/44* (2006.01)
(52) U.S. Cl.
  CPC ..... *H04N 21/2343* (2013.01); *H04N 21/2347* (2013.01); *H04N 21/8458* (2013.01)
(58) Field of Classification Search
  USPC ............................................. 380/28, 45, 210
  See application file for complete search history.

(56) References Cited

U.S. PATENT DOCUMENTS

| | | | | |
|---|---|---|---|---|
| 6,122,379 | A | 9/2000 | Barbir | 380/269 |
| 6,154,542 | A * | 11/2000 | Crandall | H03M 7/30 380/269 |
| 7,965,861 | B2 | 6/2011 | Agaian | 382/100 |
| 2003/0169940 | A1* | 9/2003 | Short | H04N 19/00 382/249 |
| 2004/0136566 | A1 | 7/2004 | Cho et al. | 382/100 |
| 2006/0088213 | A1* | 4/2006 | Enomoto | G06T 7/11 382/173 |
| 2006/0200709 | A1* | 9/2006 | Yu | H04N 19/184 714/704 |
| 2007/0005356 | A1* | 1/2007 | Perronnin | G06K 9/4676 704/245 |
| 2008/0130883 | A1* | 6/2008 | Agaian | G09C 5/00 380/54 |
| 2008/0273693 | A1* | 11/2008 | Au | H03M 7/40 380/28 |
| 2009/0169001 | A1* | 7/2009 | Tighe | H04L 9/34 380/217 |
| 2010/0067688 | A1* | 3/2010 | Au | H04N 7/1675 380/43 |
| 2010/0079311 | A1* | 4/2010 | Sluiter | H03M 7/3086 341/51 |
| 2010/0127902 | A1* | 5/2010 | Schneider | H03M 7/3088 341/51 |
| 2011/0103580 | A1* | 5/2011 | Hazay | H04L 9/32 380/28 |
| 2011/0191587 | A1* | 8/2011 | Tian | H04L 9/32 713/168 |
| 2011/0289325 | A1 | 11/2011 | Chen | 713/189 |
| 2012/0027198 | A1 | 2/2012 | He | 380/28 |
| 2012/0057637 | A1* | 3/2012 | Flachs | H04N 19/44 375/240.25 |
| 2012/0089829 | A1 | 4/2012 | Kholidy | 713/153 |
| 2012/0207213 | A1* | 8/2012 | Amon | H04N 19/436 375/240.08 |
| 2013/0027230 | A1* | 1/2013 | Marpe | H04N 19/436 341/107 |
| 2014/0064479 | A1* | 3/2014 | Manikandan | H03M 7/3062 380/28 |

OTHER PUBLICATIONS

Digital Video Encryption Algorithms Based on Correlation-Preserving Permutations, Daniel Socek,1 Spyros Magliveras,2 Dubravko ' Culibrk,1 OgeMarques,1 Hari Kalva,1 and Borko Fur, Accepted Jun. 19, 2007.*
Image Encryption Using Chaos and Block Cipher, Alireza Jolfaei (Corresponding author), www.ccsenet.org/cis Computer and Information Science vol. 4, No. 1; Jan. 2011.*
Digital Video Encryption Algorithms Based on Correlation-Preserving Permutations, Daniel Socek, 2007.*
Design of integrated multimedia compression and encryption systems, Chung-Ping Wu, Member, IEEE, and C.-C. Jay Kuo, Fellow, IEEE, IEEE Transactions on Multimedia, vol. 7, No. 5, Oct. 2005 (Year: 2005).*
Confidentiality and Privacy for Videos Storage and Transmission, Shaimaa A. El-said, Khalid F. A. Hussein, Mohamed M. Fouad Electronics and Communication Department—Faculty of Engineering—Zagazig University—Egypt, International Journal of Advanced Science and Technology vol. 28, Mar. 2011 (Year: 2011).*
Digital Video Encryption Algorithms Based on Correlation-Preserving Permutations, Daniel Socek, Spyros Magliveras, Dubravko Culibrk, Oge Marques, Hari Kalva and Borko Furht (Year: 2007).*
International Search Report and Written Opinion in International Application No. PCT/US2013/037651 dated Aug. 23, 2013.
International Preliminary Report on Patentability in International Application No. PCT/US2013/037651 dated Oct. 30, 2014.
Supplementary European Search Report in European Application No. 13778429.4 dated Nov. 27, 2015.
Wu & Kuo, "Design of Integrated Multimedia Compression and Encryption Systems" IEEE Transactions on Multimedia, IEEE Service Center, 7(5): 828-39, 2005.
Ruan & Katti, "Using Improved Shannon-Fano-Elias Codes for Data Encryption" Information Theory, 2006 IEEE International Symposium on IEEE PI, pp. 1249-1252, 2006.

* cited by examiner

SYSTEMS AND METHODS FOR SIMULTANEOUS COMPRESSION AND ENCRYPTION

This application is a national phase application under 35 U.S.C. § 371 of International Application No. PCT/US2013/037651, filed Apr. 22, 2013, which claims the benefit of priority to U.S. Provisional Patent Application Ser. No. 61/636,113, filed Apr. 20, 2012, the entire contents of each of which are hereby incorporated by reference in their entirety.

STATEMENT REGARDING FEDERALLY SPONSORED RESEARCH OR DEVELOPMENT

This invention was made with government support under NSF-HRD0932339 entitled "Center for Simulation Visualization & Real Time Prediction" awarded by the National Science Foundation. The government has certain rights in the invention.

BACKGROUND OF THE INVENTION

1. Field of the Invention

This invention relates to multimedia compression and encryption and more particularly relates to systems and methods for simultaneous compression and encryption.

2. Description of the Related Art

Data compression and encryption have become integral parts of digital interactions. These two operations are fundamental to the efficient bandwidth utilization and informational security during transmission of data-dense media (such as image and video) over large-scale communication networks such as the Internet. This combination of compression and encryption improves the rate of transmission of large files while privatizing the informational content even over a publicly accessed network.

Media formats specify how a type of file should be packaged. Specifically, formats specify how information describing a file should be represented as digital data. Often, formats describing files containing, large amounts of data (such as audio, image, and video media) include a method for which to compress the file. This minimizes the amount of data needed to contain the file by removing extraneous information and statistical redundancies. This in turn allows for more efficient movement of the file from hard drives to memory and back, and over distributed communications networks.

Because information is being exchanged with increasing frequency over these communications networks, it is also imperative to ensure the security of these files. Using encryption, data is rendered unintelligible to the unlicensed user or a user that does not possess the proper decryption key. Indeed, for many applications—e.g., confidential transmission, video surveillance, military, and medical data transfer—data security is of the utmost importance.

However, because encryption hides the redundancies within a data set which a compression algorithm must exploit, encryption should not (in general) be performed before compression. Therefore, it is usually a requirement to compress a file before encrypting it. If a file has little redundancy to begin with, this type of system will provide a suboptimal compression ratio. In many cases, the compression operation will actually inflate the size of the file that was intended to be compressed.

Therefore, the traditional means to compress and encrypt data is to first compress the data as near as possible to its entropy rate using a standard entropy encoder. This operation immediately strips the data of statistical redundancies. Following compression, the data is encrypted using the technology of choice. At the receiver end of the information channel, one decoder first performs decryption using the encryption key, and another decoder finally decompresses the decrypted bitstream to reconstruct the original data.

U.S. Pat. No. 6,122,379 describes a method by which a signal could be simultaneously encrypted by using an adaptive data modeler which updates the cumulative statistics of an arithmetic encoder and random instances according to a randomly generated keystream. This method has four key faults: 1) because the plaintext statistics are only updated at random instances an optimal compression ratio cannot be achieved, 2) if a plaintext exhibits high statistical regularity, random statistical updates only marginally alter the statistical representation of the plaintext by the encoder and provide a weak encryption, 3) if a plaintext exhibits quick variations in its statistics (as is common audio and visual media), then method of adaptive modeling presented will not serve as a good prediction for future plaintext symbols, resulting in a far less than optimal compression ratio, and 4) the method only uses a stream cipher, which are known to be susceptible to known-plaintext attacks, and will provide sub-standard security.

U.S. patent application Ser. No. 11/740,742 describes a method which serves simultaneously compresses an encrypts a binary plaintext by applying a one-time-pad (the XOR operation) with a randomly generated binary sequence and using a type of run-length coding in which the encoder compresses long runs recognized from the random sequence. In fact, considering that the input plaintext is encrypted with a one-time-pad before any type of compression takes place, this method is not a true simultaneous compression and encryption method; rather, it is a sequential method which first encrypts data, then compresses that data based on the knowledge of how it was encrypted. This method clearly has limitations as it can only process binary data and can only offer competitive compression of highly redundant data. It is also susceptible to the well-documented weakness in security of practical implementation of a one-time-pad.

U.S. Pat. No. 5,479,512 is a much generalized method for simultaneous compression and encryption (although it is truly a sequential solution). Here the data is first compressed and afterwards segmented, shuffled, and encrypted. This is not a true implementation of simultaneous compression and encryption and will suffer from the computational complexity of two distinct operations rather than one.

U.S. Pat. No. 4,386,416 is an amalgamation of an adaptive-dictionary coder and a Huffman coder used to provide simultaneous compression and encryption. Based on the occurrence of a word in the adaptive library, the encoder will switch between the library representation and a Huffman coded output. This type of coding cannot approach the compression ratios of many modern coders and does not provide a true encryption as the output is not key dependent. Therefore, one only needs to know the method by which a file was compressed in order to decode it.

U.S. Pat. No. 6,154,542 chooses a compression method based on a key in order to provide simultaneous compression and encryption. This method has extremely weak security as an attacker only needs to decompress the ciphertext with known compression methods until a sensical plaintext is recovered. This will also recover the key used to choose the compression type. Furthermore, because the type of compression used could vary greatly, so could the resulting compression ratios of files to be encoded.

SUMMARY OF THE INVENTION

Embodiments of systems and methods for simultaneous encryption and compression which provide strong security, competitive compression ratios, suitability for use on encrypted or highly random data, and a fast implementation with respect to sequential compression and encryption are presented.

Such embodiments may include reversible systems and methods configured to perform fast, secure and efficient transmission, storage, and protection of digital multimedia data. In various embodiments, multimedia data may include text, audio, video, 3D, and other media. The embodiments may simultaneously compress and encrypt digital data in order to concurrently reduce data size and prevent reconstruction without the proper encryption key. Embodiments of a method may include pre-processing data to optimize the size of data segments to be compressed, transforming the data for improving the compressibility of the before-mentioned data segments, encoding the data for simultaneously encrypting and compressing data segments using a keystream, and increasing both the compression ratio and security of these encoding processes using a block cipher. Embodiments of these methods may be suitable for use on both encrypted and unencrypted media.

This invention has immediate application to all entities participation in the storage or transmission of digital data. Because of the prevalence of both wired and wireless communication channels in modern society, there is a need for two things for which the disclosed invention can provide: 1) Secure storage and transfer of private information, and 2) Reliable storage transfer of information. Data security requires encryption of information in order to disguise it from unwanted interceptors while reliable storage and transfer requires compression of data to minimize processing time and to minimize bandwidth usage.

Embodiments of the present invention primarily focus on performing compression and encryption of data in a single "simultaneous" step, rather than in two distinct, computationally expensive operations. By integrating the encryption process into the behavior of the compressive coder, the methods ensure that at no time can the output be compressed but not encrypted or encrypted but not compressed (unless the encryption key is made public). In many cases, the encryption steps detailed here actually improve compressive performance of an encoder beyond that of other contemporary compression algorithms. The present embodiments include methods for altering the state of an entropy coder (such as Huffman, arithmetic, or range type coder) based on a keystream which concurrently randomizes and optimizes the compression/encryption process. Such a method may be referred to as either "secure compression" or "simultaneous compression and encryption" ("SCE Coding" as used herein).

Potential uses may include medical imaging, media distribution, military applications, intellectual property protection, confidential transmission, secure banking, identity protection, video surveillance, and general protection of privacy. In medical imaging, images are high resolution with extremely large file sizes and typically are secured for patient confidentiality. In media distribution, large encrypted files are transmitted quickly and efficiently. Accordingly, the present embodiments are useful for at least these described applications.

The term "coupled" is defined as connected, although not necessarily directly, and not necessarily mechanically.

The terms "a" and "an" are defined as one or more unless this disclosure explicitly requires otherwise.

The term "substantially" and its variations are defined as being largely but not necessarily wholly what is specified as understood by one of ordinary skill in the art, and in one non-limiting embodiment "substantially" refers to ranges within 10%, preferably within 5%, more preferably within 1%, and most preferably within 0.5% of what is specified.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements possesses those one or more steps or elements, but is not limited to possessing only those one or more elements. Likewise, a step of a method or an element of a device that "comprises," "has," "includes" or "contains" one or more features possesses those one or more features, but is not limited to possessing only those one or more features. Furthermore, a device or structure that is configured in a certain way is configured in at least that way, but may also be configured in ways that are not listed.

Other features and associated advantages will become apparent with reference to the following detailed description of specific embodiments in connection with the accompanying drawings.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION

Figure 1:
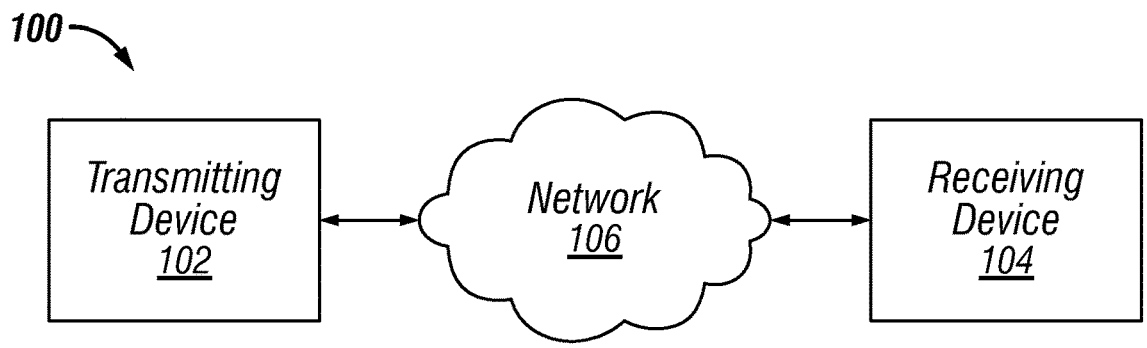
FIG. 1 is a schematic block diagram illustrating one embodiment of a system for simultaneously compressing and encrypting data.

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure.

Certain units described in this specification have been labeled as modules, in order to more particularly emphasize their implementation independence. A module is "[a] self-contained hardware or software component that interacts with a larger system. Alan Freedman, "The Computer Glossary" 268 (8th ed. 1998). A module comprises a machine or machines executable instructions. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, comprise one or more physical or logical blocks of computer instructions which may be organized as an object, procedure, or function. Nevertheless, the executables of an identified module need not be physically located together, but may comprise disparate instructions stored in different locations which, when joined logically together, comprise the module, and when executed by the processor, achieve the stated data transformation.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

One embodiment of a system for implementing a stream cipher based Elias coding method which can produce a secure, compressed code is described. First, a keystream is generated from the input of an encryption key into a pseudo-random number generator (PRNG). The input plaintext is analyzed by a statistics modeler which generates a mapping of the plaintext statistics for use in an entropy coder. As each plaintext symbol is processed by the entropy coder, the statistical representation of the plaintext is updated, remapped, and optimized in a pseudo-random fashion according to the keystream. This results in a compressed output that is also encrypted according to the encryption key.

A Fast, Efficiency-Preserving System for Simultaneous Compression & Encryption, describes further aspects of an embodiment of Elias coding that may be adapted for use according to embodiments of the present invention. Proc. SPIE 8063, Mobile Multimedia/Image Processing, Security, and Applications 2011, 80630F (May 26, 2011). The contents of this publication are incorporated herein by reference.

FIG. 1 is a schematic block diagram illustrating one embodiment of a system 100 for simultaneous compression and encoding (SCE) of data. In the depicted embodiment, the system 100 includes a transmitting device 102 and a receiving device 104. The transmitting device 102 may be coupled to the receiving device 104 through a network 106. For example, the transmitting device 102 may be a multi-media server and the receiving device may be a user device such as a personal computer, a laptop, a mobile device such as a smartphone or tablet computer, or the like. In one such example, a smartphone may be coupled to the multimedia server via a wireless broadband data network or the Internet. One of ordinary skill in the art will recognize a variety of devices that may comprise the transmitting device 102 and the receiving device 104.

Figure 2:
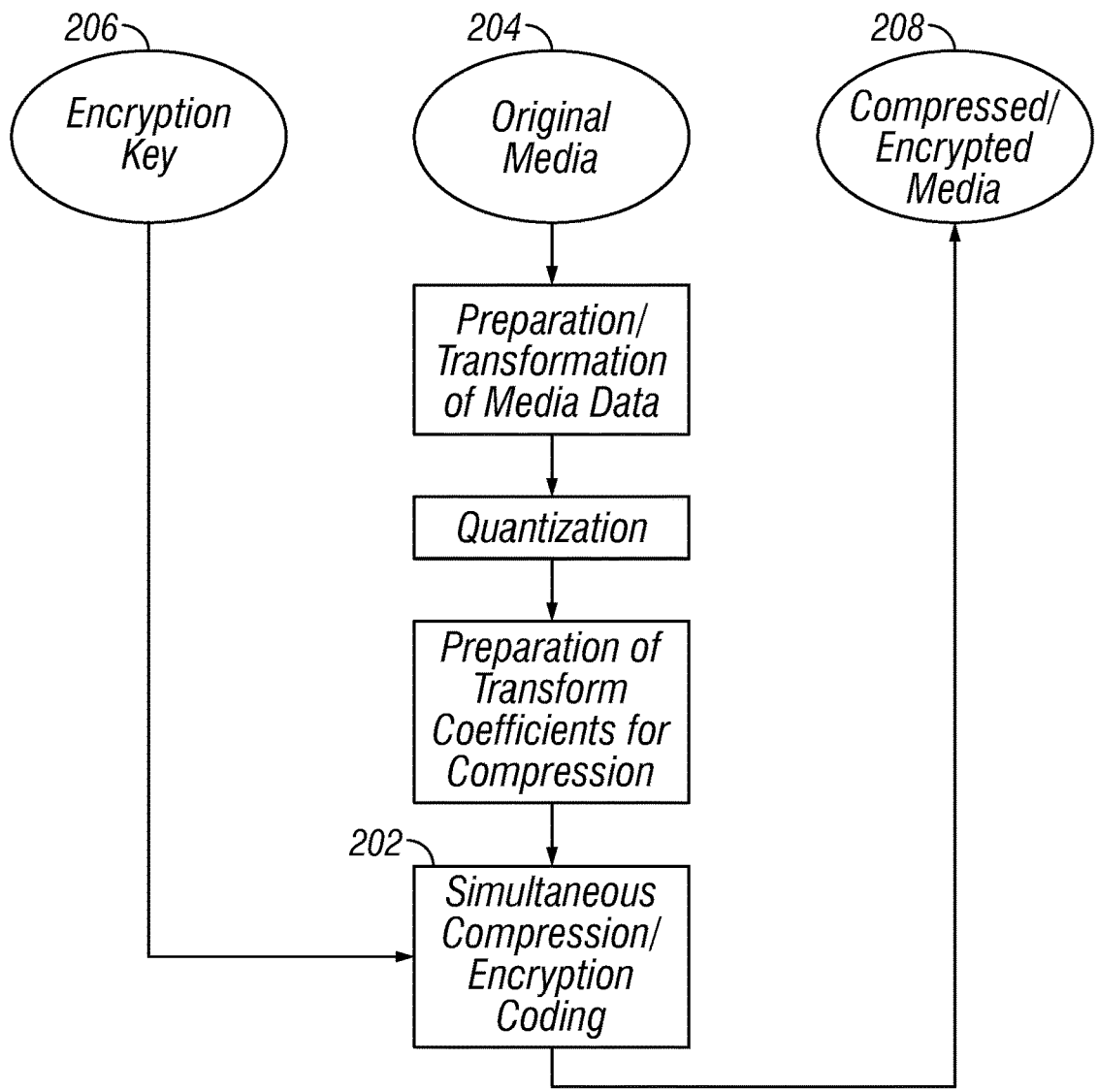
FIG. 2 is a schematic diagram illustrating one embodiment of a system for simultaneously compressing and encrypting data.
Figure 3:
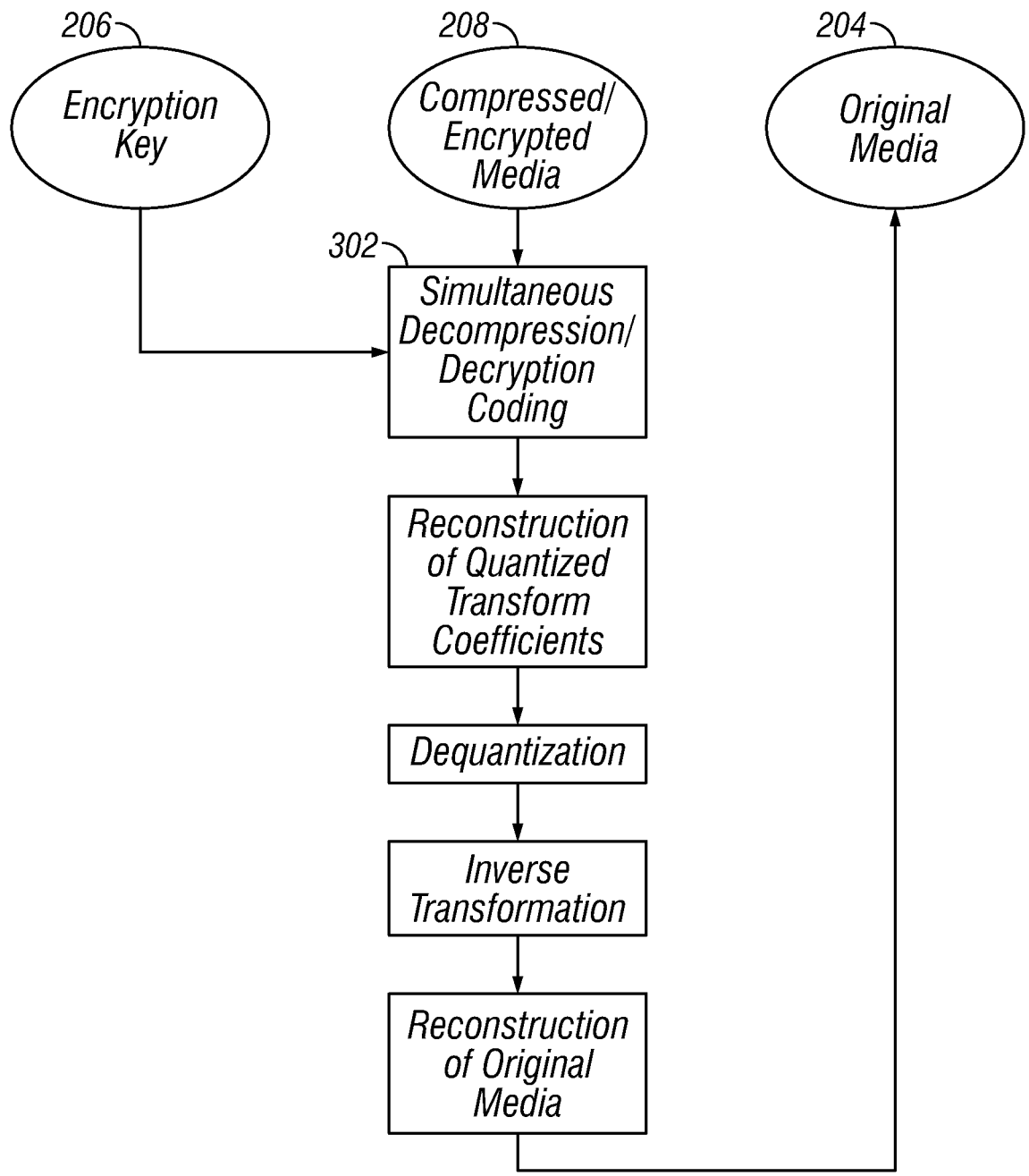
FIG. 3 is a schematic diagram illustrating one embodiment of a system for simultaneously decompressing and decrypting data.

SCE can be used by itself or as a distinct operation within the framework of a compressive codec in order to achieve fast, simultaneous compression and encryption. Functional block diagrams using SCE for compression and decompression as specified by a media codec are shown in FIGS. 2 and 3. In these examples, the Simultaneous Compression/Encryption Coding (SCE) block 210 replaces the usual lossless coder in the same location. This allows the codec to provide simultaneous encryption with compression. Other processing blocks describe the usual components of the codec which are used to prepare the media for compression.

FIG. 2 is illustrative of an example of a Simultaneous Compression/Encryption (SCE) integrated into a media codec. The embodiment of FIG. 2 illustrates how an encryption key 206 is used by SCE coding module 202 to generate compressed and encrypted media 208 from original media 204. FIG. 2 also illustrates modules for preparing and/or transforming data such that it is suitable for the SCE process, quantization, and preparation of transform coefficients for compression. One of ordinary sill in the art may recognize one or more methods that may be suitably adapted for use with these modules such that the original media 202 may be simultaneously compressed and encrypted by SCE coding module 202.

FIG. 3 is illustrative of an example of a Simultaneous Decompression/Decryption integrated into a media codec. In the depicted embodiment, the encryption key 206 may be used by the simultaneous decompression/decryption coding module 302 to simultaneously decompress and decrypt the compressed and encrypted media 208 to extract the original media 202. Additional modules for reconstruction of quantized transform coefficients, dequantization, inverse transformation, and reconstruction of the original media 202.

An embodiment of a system may be configured to perform methods for SCE coding, including: 1) data pre-processing, 2) data preparation, 3) histogram decomposition, 4) encryptive entropy coding, 5) run-length, predictive, or adaptive dictionary coding, 6) block cipher encryption, and 7) public key encryption. One or more of these steps may be optional. Block diagrams of embodiments of an encoder and decoder are provided in FIG. 3 and FIG. 4 respectively.

Figure 4:
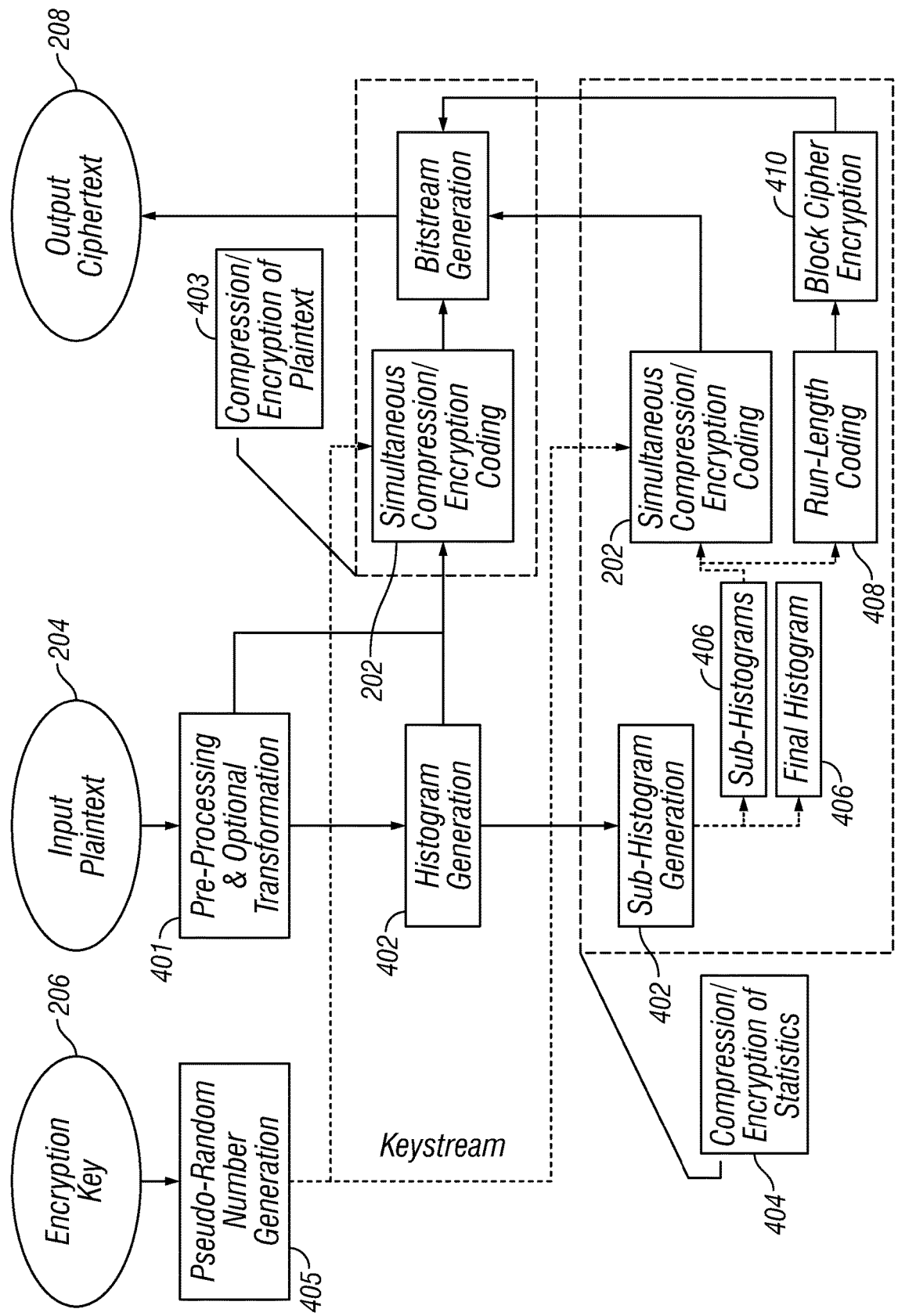
FIG. 4 is a schematic diagram illustrating one embodiment of a system for simultaneously compressing and encrypting data.

FIG. 4 Illustrative an example of an SCE encoder configuration. In the embodiment of FIG. 4, the system may include a pseudo-random number generator 405 configured to provide a keystream to the SCE coding modules 202. One or more SCE coding modules 202 may be used. The input data 202 may be pre-processed and optionally transformed by pre-processing/transformation module 401. Additionally, a histogram generation module 402 may generate a histogram describing a the statistics of an input sequence. The keystream, the pre-processed input data and the histogram may be used by a first SCE coding module 202 to generate SCE data.

In one embodiment, the system may include additional histogram modules 402, 406 for generating sub-histograms and sub-sub histograms for use by a second SCE coding module 202. In a further embodiment, a run-length coding module 408 and a block cipher encryption module 410 may additionally be used to encode and encrypt the sub histograms. These blocks ciphered histograms may be combined with the SCE data by bitstream generation module and an output cipher coded bitstream may be formed.

Figure 5:
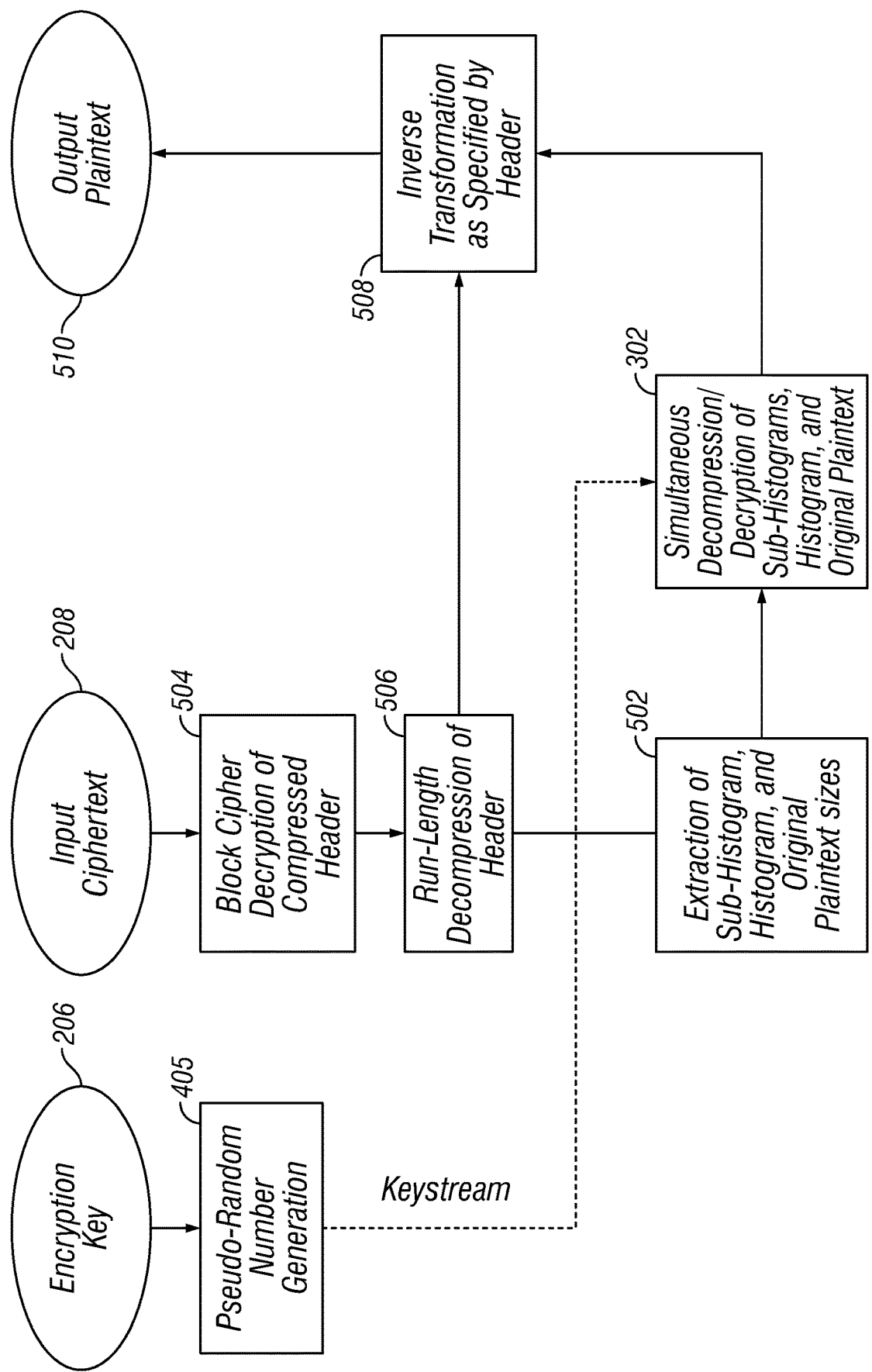
FIG. 5 is a schematic diagram illustrating one embodiment of a system for simultaneously decompressing and decrypting data.

FIG. 5 Illustrative an example of an SCE decoder configuration. In this embodiment, a pseudo-random number generator 405 also generates a keystream. The input data 208 the compressed header of the input data 208 is decrypted by module 504. The deader of the input data 208 is then decompressed by the run-length decompression module 506. The histograms and original data sizes are extracted by module 502 and provided along with the keystream to the SCE decompression/decryption module 302. Finally, an output 510 is generated by inverse transformation module 508 using the header information.

Pre-Processing

The goal of the pre-processing step is to determine a proper segmentation of the plaintext into compression blocks and whether or not to perform a context-ordering transform. The purpose of segmenting the plaintext into compression blocks is to exploit contextual redundancy in surrounding data samples to achieve better compression. For example, the sequence [2 2 2 2 0 0 0 0 1 1 1 1 3 3 3 3] is highly random over the entire length of the sequence and cannot be compressed efficiently using an entropy coder. However, it is noticeable that the sequence only changes characters every four symbols. Thus, we can segment the sequence into groups of four symbols and compress each segment separately to gain a higher compression ratio. Contextual ordering reduces the entropy of these segments by grouping symbols which frequently occur near each other.

Pre-processing consists of a windowed entropy measure and frequency analysis thereof. In order to compute the windowed entropy measure, the entropy is calculated over sliding windows of plaintext data and normalized by division of the entire plaintext entropy. Small variation in the entropy measure indicates little contextual ordering within the plaintext and that a context-ordering transform will not be beneficial. Larger variance, on the other hand, will indicate that the statistics of the plaintext vary regionally and can benefit from a context-ordering transform. This decision can be implemented using thresholding or a fuzzy decision system.

Frequency analysis can mathematically describe this variance in entropy over the plaintext and used to determine an optimal segmentation size—that is, how many symbols should be grouped into blocks of data to be compressed separately. One option is to take a period value corresponding to a significant peak in the magnitude of Fourier Transform of the entropy measure sequence. This value will indicate the period over which the statistics of the plaintext regularly change. A fraction of this value should provide a good segmentation size.

Data Preparation

Data preparation is the implementation of an operation which improves compression of the plaintext segmentations. In this example, the decision is made by the pre-processing step to perform or skip a context-ordering transform step. Such a transform is the Burrows-Wheeler Transform (BWT). The context sorting properties of the BWT can be improved with respect to the plaintext segmentation by application of the BWT to different bit extensions of the plaintext. For example, if we have 7-bit ASCII coded text to compress, a 56 bit extension of the plaintext (which are groups of 8 ASCII symbols) could be sorted by the BWT, followed by a 28-bit extension of the plaintext (groups of 4 ASCII symbols) for sorting by the BWT, followed by a 14-bit extension (groups of 2 ASCII symbols) for sorting by the BWT, and finally a 7-bit extension (groups of 1 ASCII symbol) for sorting by the BWT.

Figure 6:
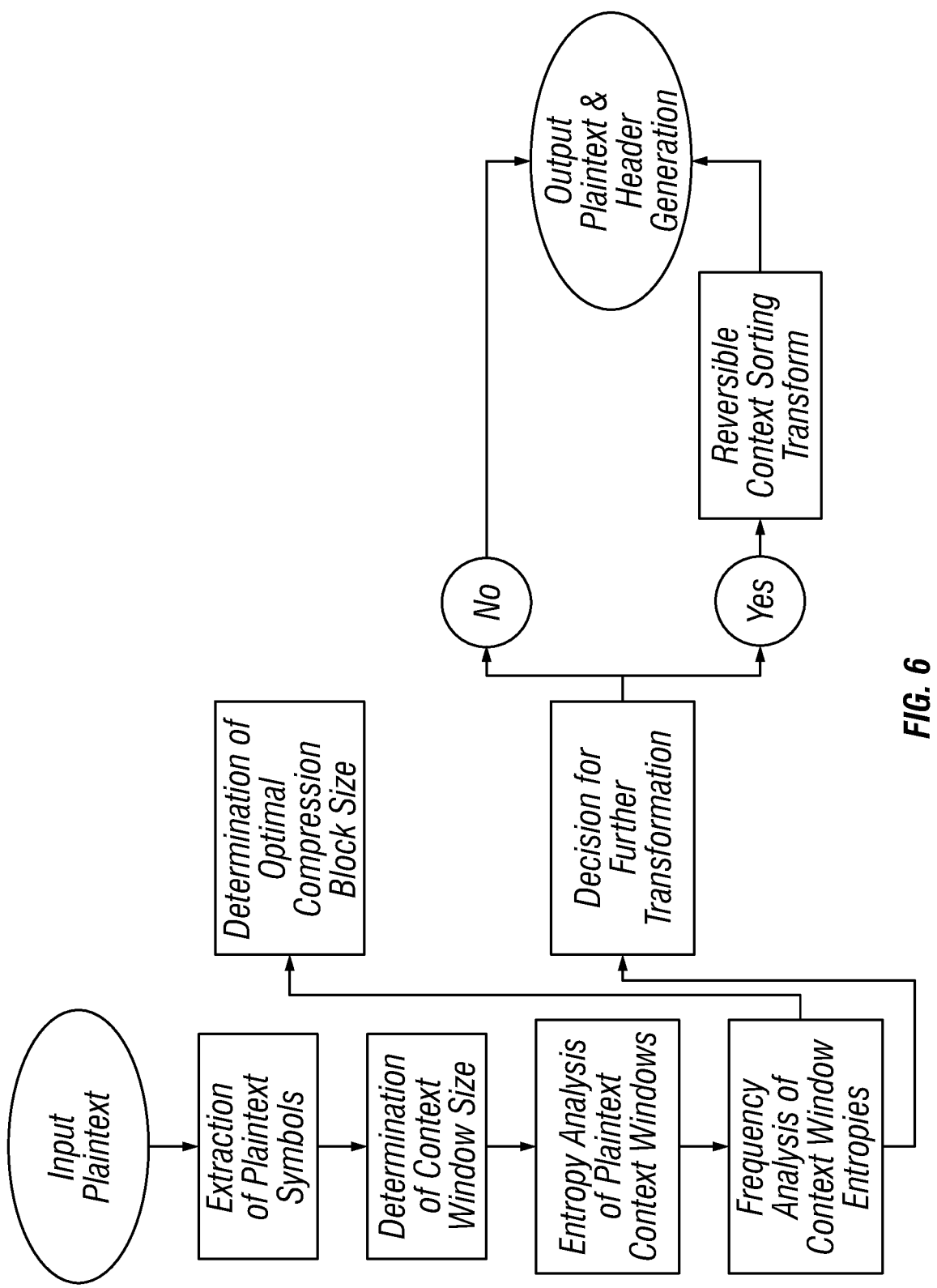
FIG. 6 is a schematic diagram illustrating one embodiment of a method for pre-processing and data preparation.
Figure 7:
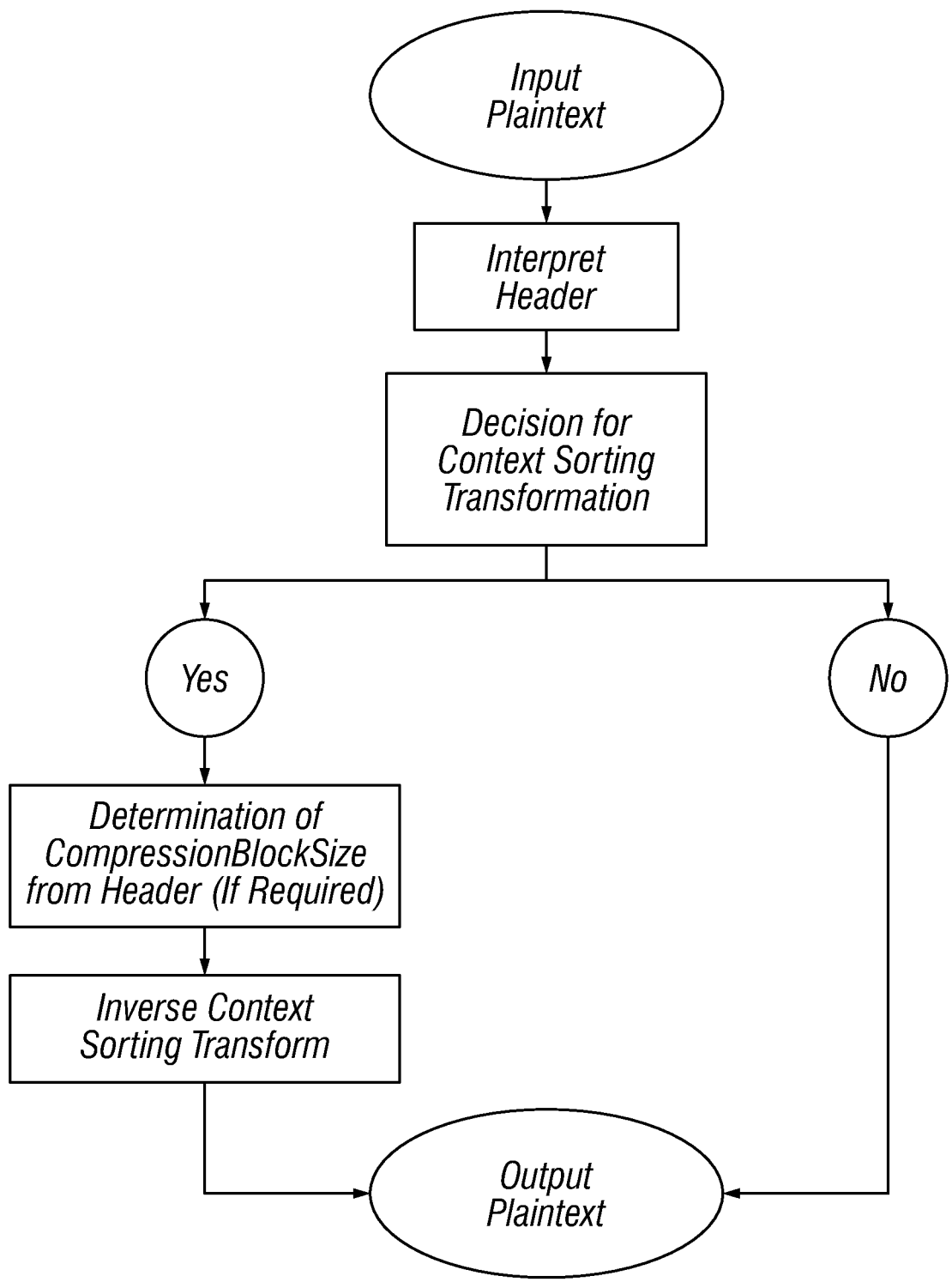
FIG. 7 is a schematic diagram illustrating one embodiment of a method for a reverse algorithm for SCE pre-processing and data preparation.

The forward pre-processing and optional preparation steps are described in the block diagram of FIG. 6. The reverse process is shown in FIG. 7.

Histogram Decomposition

Histogram decomposition involves measurement of the statistics of each segment to be compressed from the plaintext (or transformed plaintext). (Those skilled in the art will realize that the measured statistics need not be explicitly stored as histograms, but can be alternately stored using a probabilistic model of choice.) These histograms (or some bit extension or contraction thereof) are further decomposed into sub-histograms measuring the histogram statistics. This process is repeated until the length of a sub-histogram sequence is less than or equal to the plaintext segmentation size. All histograms and sub-histograms are stored for encryption and compression. For reconstruction, an exact representation of a sub-histogram must be used to decompress/decrypt the data one level up.

Encryptive Entropy Coding

The state of lossless compressive encoder is altered according to both the input file to be encoded and a randomly generated keystream for which the encoder outputs a simultaneously compressed and encrypted ciphertext file. The interaction between the encoder, input file, and keystream is nonlinear and serves to secure both the original file and the keystream while providing better compression ratios than other contemporary lossless coders. With knowledge of the proper keystream and ciphertext, this process can be reversed to recover the original file. The methods are fast and are easily integrated into both lossless and lossy media compression standards.

The coding procedure employs a key-based entropy encoder. Either prior or concurrent to the encoding process, a binary keystream must be generated from an input code key. This can be accomplished using a pseudorandom number generator. The key sequence is not required to be long, but should have length (either total or period) which is relatively prime to any bit extension used in representation of the statistics of the input data.

An entropy encoder uses a mapping of the input's statistics in order to provide compression. The input's statistics may be provided dynamically from either an adaptive or non-adaptive predictor, or from a previously measured set of statistics. During the coding process, a pre-defined operation based on an alphabetic extension of the keystream is applied to the statistical representation of the input in order to alter the state of the encoder. This operation will both optimize and randomize the state of the encoder. If the size of the extension is dependent on both the statistics and the ordering of the input plaintext, a nonlinear relation will be maintained between the encryption and the keystream. The significance of this nonlinearity increases with the use of adaptive coding. Effectively, this makes the functional keystream unpredictable in size and serves to obscure the original keystream while encrypting the input plaintext while maintaining the compression performance of the encoder.

For example, we can modify an adaptive range encoder to compress and encrypt using a randomly generated keystream. To do this, we create a binary keystream of length which is relatively prime to the number of symbols within the plaintext alphabet. The encoder will operate on a representation of the plaintext statistics in the form of a histogram or probability distribution, the former as calculated in the previous histogram decomposition step and the latter calculated dynamically from either a pre-determined statistical model and or an adaptively updated statistical model based on previously observed sequential data. This histogram or distribution is mapped to a set of intervals used for coding. These intervals will be permuted according to the keystream at variable stages also defined by the keystream. However, it is not desirable to move more-likely intervals to the top of the range and less-likely intervals to the bottom as this can negatively impact coding efficiency. To mitigate this problem, the intervals are sorted in descending size and only permuted with intervals of similar size. In this particular case, intervals with equivalent significant bits are permuted together. How these permutations are supposed to take place is defined by bit extensions of the keystream, the size of which is determined by the number of similarly-sized intervals to be permuted together. Thus, the bit extensions of the keystream can vary greatly. Because the encoder is adaptive, the intervals are updated each time a new symbol is input, and the size of each interval corresponding to a symbol will change as well. This causes groups of intervals corresponding to different symbols to be permuted together each time. This process need not be carried out every time a symbol is input and the encoder speed can be increased by only performing these permutations according to sequential readings of an extension of the bitstream.

This solution provides a fast optimization to the compression process and adds inherent encryption. This type of coding should be applied to the plaintext all but the final sub-histogram sequence stored for compression. In order to decrypt the ciphertext, each sub-histogram must be decrypted properly in order to decrypt the higher-level sub-histogram (or actual plaintext data) it describes. This effectively creates a short sequence, the final sub-histogram, which is essential to decrypting the entire ciphertext.

Figure 8:
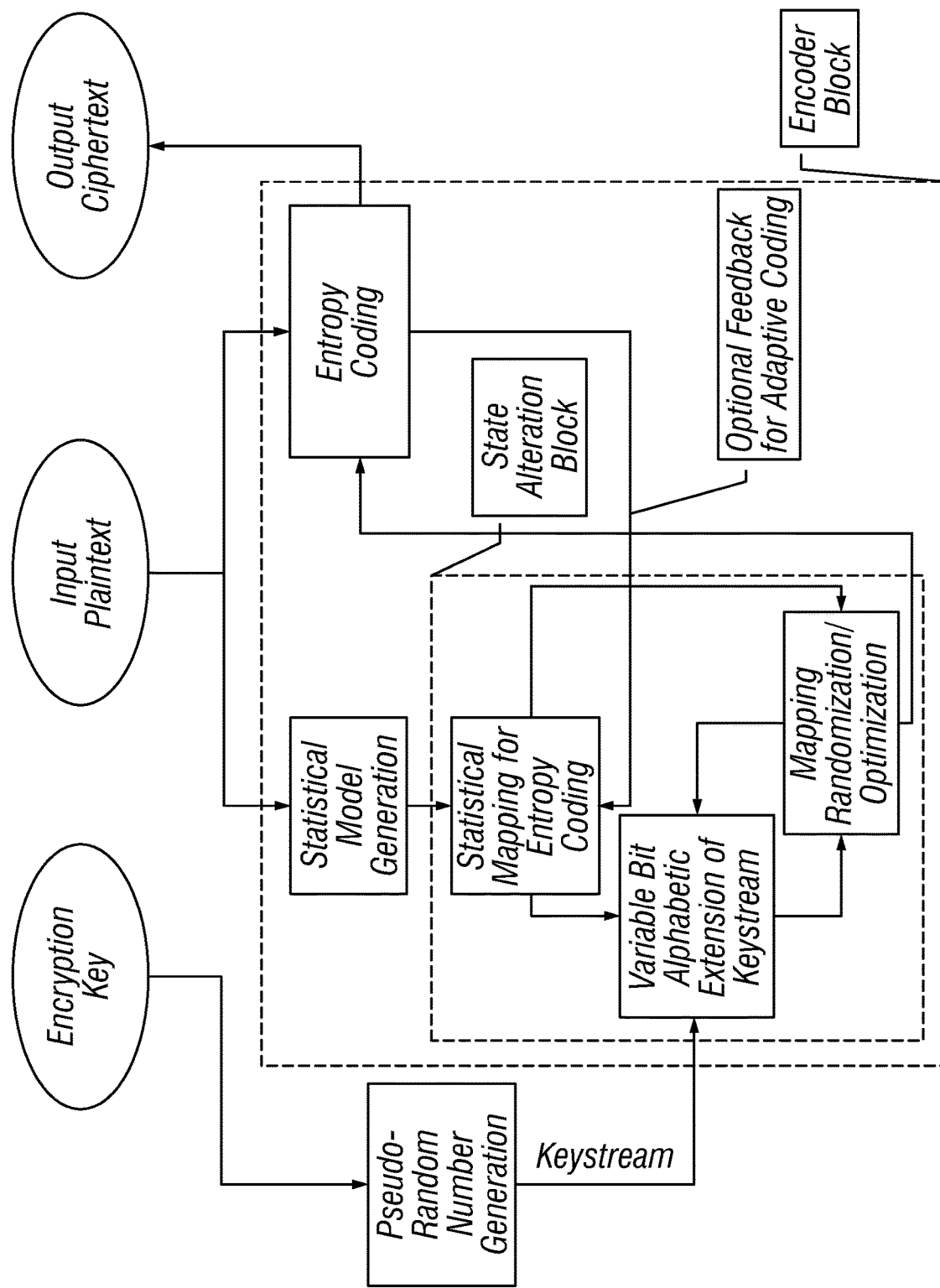
FIG. 8 is a schematic diagram illustrating one embodiment of a method for encryptive entropy encoding.
Figure 9:
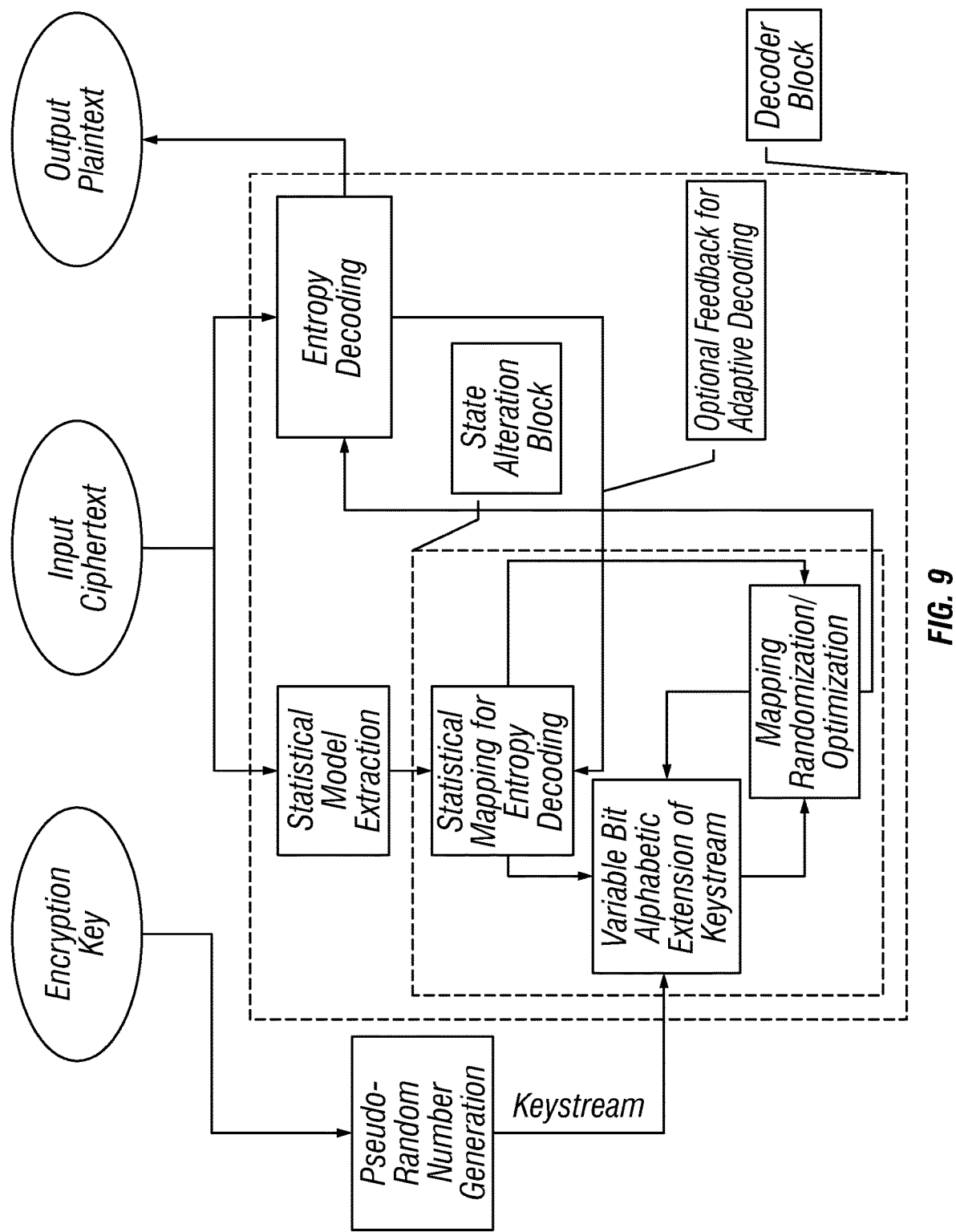
FIG. 9 is a schematic diagram illustrating one embodiment of a method for encryptive entropy decoding.

Simple block diagrams of the forward and reverse encryptive entropy coding steps are illustrated in FIG. 8 and FIG. 9.

Run Length or Adaptive-Dictionary Coding

Because no statistics are measured for the final sub-histogram it cannot be compressed by and entropy coder. However, an effect of the histogram decomposition process is that the entropy of each successive sub-histogram is reduced. Thus, the final sub-histogram sequence should have long runs of similar symbols. Run length and adaptive-dictionary encoders such as DEFLATE, LZW, PPM, CTW, or other predictive compression methods can be used to compress the final sub-histogram.

Block Cipher Encryption and Public Key Encryption

Because the final sub-histogram (or statistical representation of choice) is key to unlocking all higher-level sub-histograms, histograms, and plaintext sequences the final sub-histogram should also be encrypted. This can be solved by application of either a block cipher (such as DES or AES) or a public key cipher (such as RSA) depending on the desired usage. In general, these ciphers are very hard to crack even with a known plaintext attack. However, because of their computational complexity they can be very slow in implementation. Because SCE only employs these methods on a small amount of data which is necessary for reconstruction of the original plaintext, the computational computation time spent on these operations is minimized.

When statistical models are generated by updating and predicting statistics based upon previously observed sequential data, the statistical models used in prediction can be obscured through further encryption of an initial portion of the already compressed and encrypted sequence. This can be achieved by application of either a block cipher (such as DES or AES) or a public key cipher (such as RSA) to a small, initial portion of the encoded bit stream. In general, these ciphers are very hard to crack even with a known plaintext attack. However, because of their computational complexity they can be very slow in implementation. Because SCE only employs these methods on a small amount of data which is necessary for reconstruction of the original plaintext, the computational computation time spent on these operations is minimized.

The overall security obtained by using a stream cipher (which are the permutations in the encryptive entropy coding stage), compression (locking the necessary reconstruction data in shorter-and-shorter sub-histograms), and a block cipher provides a highly secure ciphertext. Because the overall computational complexity similar to a common entropy encoder such an implementation can also be very fast.

Illustrative embodiment 1: Consider a media distribution system for a video content provider. It is desirable to compress the media so that video media can be transferred to a user efficiently: quickly and using minimal bandwidth. It is also desirable for the bit stream representing the video media to be encrypted so that an unregistered user cannot access the uncompressed content. If the media is in high definition, it might be compressed using a standard such as H.264 (mpeg-4). This standard uses a series of algorithms to prepare video data into a form more usable by an entropy encoder. Typically, this is a specialized arithmetic coder. To provide encryption without loss of compressive performance, the arithmetic coder can be simply modified according to the methods laid out here. Only an authorized user with access to the encryption key can reconstruct the original video.

Illustrative embodiment 2: Consider a situation where it is desirable to store or exchange reconnaissance images for military application. Many images are taken and are required to be compressed for minimal storage and expedient transmission. It is not desirable for these images to be accessible to persons without clearance, and the images must also be encrypted. Typically, encryption and compression must be performed one after the other. However, it is impossible to compress encrypted data. Therefore, if the images are highly secure and must first be encrypted before any distribution, compression will be ineffective. Rather, it is more efficient to encrypt and compress simultaneously for both security and efficient distribution or storage.

Illustrative embodiment 3: Consider a detailed classified government document of very long length. It is encrypted upon creation but must be sent to another government official. In this case, compression cannot be performed because the document is encrypted and the file cannot be efficiently transmitted. Also, compression must be lossless in order to preserve both the integrity and readability of the document. To facilitate both the requirements of encryption and compression, a simultaneous method as described above should be used to fulfill both encryption and compression requirements.

EXAMPLES

An adaptive SCE encoder (and corresponding decoder) was implemented in MATLAB code. The encoder output was compared to MATLAB implementations of pure Huffman and Adaptive Arithmetic entropy coders in the lossless case with respect to both compression performance and algorithm complexity. Compression performance was measured by the compression ratio C=bits original/bits compressed which provides a measure of how many times smaller a compressed file is. Therefore, the larger the compression ratio, the better the compression performance of the coder.

SCE was also integrated into an implementation of the JPEG standard to provide a lossy compression at similar quality levels. Total compression between the SCE version of JPEG and traditional JPEG was also compared with the quality level set to medium. Results are summarized for each of three images of six classes which exhibit different types of statistics. Table 3 summarizes the results for natural, binary, textured, randomly generated, and commonly tested, and already-encrypted image classes, respectively. Table 4 provides the average computational time comparison between SCE and Adaptive Arithmetic compression followed by AES encryption for the images of Table 3.

All of the methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention as defined by the appended claims.

What is claimed is:

1. A method for simultaneously compressing and encrypting an input data set for efficient transmission from a transmitting device and recovery at a receiving device comprising:
transforming the input data set at the transmitting device by:
mapping the input data set into an entropy measure sequence by performing a windowed entropy measure over plaintext data samples and performing frequency analysis of the entropy variation over the plaintext data;
segmenting the input data set based on a period value corresponding to a significant peak in the magnitude of Fourier Transform of the entropy measure sequence;
generating one or more statistical models that represent a statistical measurement of the input data set segments;
changing a state of a compressive entropy encoder according to an encryption key and the one or more statistical models to simultaneously compress and encrypt the input data set;
transmitting the input data set from the transmitting device to the receiving device.

2. The method according to claim 1, further comprising compressing the one or more histograms according to a Run-Length compression process, an Adaptive Dictionary compression process or a block cipher process.

3. The method according to claim 2, wherein generating the one or more histograms further comprises dividing a first histogram into a plurality of sub-histograms until a size of the sub-histograms is less than or equal to a predetermined limit.

4. The method according to claim 1, further comprising preparing the input data set to improve compression of plaintext data segmentation.

5. The method of claim 4, wherein preparing further comprises performing a context sorting process or a Burrows-Wheeler Transformation on a different binary extension of the input data set.

6. The method according to claim 1, wherein the compressive entropy encoder is an Elias encoder.

7. The method according to claim 6, wherein the compressive entropy encoder performs an arithmetic coding process or a Range coding process.

8. A method of simultaneously decompressing and decrypting an input ciphertext, which was obtained by simultaneously compressing and encrypting an input plaintext according to the method of claim 1, by decrypting an initial portion of said input ciphertext according to a block cipher, and simultaneously decompressing and decrypting the remaining data portions of the input ciphertext by altering the state of an entropy decoder in the same sequence as the state of the entropy encoder that compressed and encrypted the input plaintext.

9. A non-transitory tangible computer readable medium comprising computer executable code that when executed by a computational device causes the computer to perform operations for simultaneously decompressing and decoding an input data set, wherein the operations comprise the steps of claim 8.

10. A system configured to simultaneously compress and encode an input data set comprising one or more modules configured to perform the method steps described in claim 1.

11. A non-transitory tangible computer readable medium comprising computer executable code that when executed by a computational device causes the computer to perform operations for simultaneously compressing and encoding an input data set, wherein the operations comprise the steps of claim 1.

* * * * *